(12) United States Patent
Brezovnik et al.

(10) Patent No.: US 6,640,694 B2
(45) Date of Patent: Nov. 4, 2003

(54) ELECTRICAL HOUSEHOLD APPLIANCE

(75) Inventors: Peter Brezovnik, Mozirje (SI); Henrik Pavlovic, Ljubno ob Savinji (SI); Jurij Pesec, Petrovce (SI); Igor Zibret, Smartino ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/261,199

(22) Filed: Sep. 30, 2002

(65) Prior Publication Data

US 2003/0070565 A1 Apr. 17, 2003

Related U.S. Application Data

(63) Continuation of application No. PCT/EP01/02081, filed on Feb. 23, 2001.

(30) Foreign Application Priority Data

Mar. 31, 2000 (DE) .......................................... 100 16 301

(51) Int. Cl.[7] .............................. A23L 1/00; A23N 1/00; A47J 43/08; A47J 44/00; B01F 9/00
(52) U.S. Cl. ............................. 99/348; 99/492; 99/511; 366/205; 366/314
(58) Field of Search .......................... 99/484, 485, 486, 99/489, 492, 495, 509–513; 210/360.1, 380.1; 241/37.5, 73, 92, 86.1, 89.3, 282.2, 282.1, 261.1, 101.2, 199.12; 366/314, 601, 205, 206; 426/61, 63, 49, 52, 533, 599; 494/36, 43, 56, 58; 310/50, 88

(56) References Cited

U.S. PATENT DOCUMENTS

| 2,913,230 A | * 11/1959 | Hutchins .................. 99/348 X |
| 3,447,000 A | * 5/1969 | Dugan et al. ............. 99/348 X |
| 4,783,173 A | * 11/1988 | Artin .......................... 366/314 |
| 5,074,201 A | 12/1991 | Takeyama et al. |

FOREIGN PATENT DOCUMENTS

| EP | 0 317 095 A1 | 5/1989 |
| FR | 2 294 360 | 7/1976 |
| FR | 2 758 451 | 7/1998 |
| JP | 10-174657 | 6/1998 |

* cited by examiner

Primary Examiner—Timothy F. Simone
(74) Attorney, Agent, or Firm—Laurence A. Greenberg; Werner H. Stemer; Gregory L. Mayback

(57) ABSTRACT

An electrical household appliance, in particular, a food processor, includes a drive motor installed in a housing having at least one bottom and one top housing part. The housing parts are held together by a screw connection. A largely vibration-isolated connection of the two housing parts is achieved by introducing, at the connecting locations, elastic buffer elements that prevent direct contact of the housing parts at the connecting locations.

12 Claims, 1 Drawing Sheet

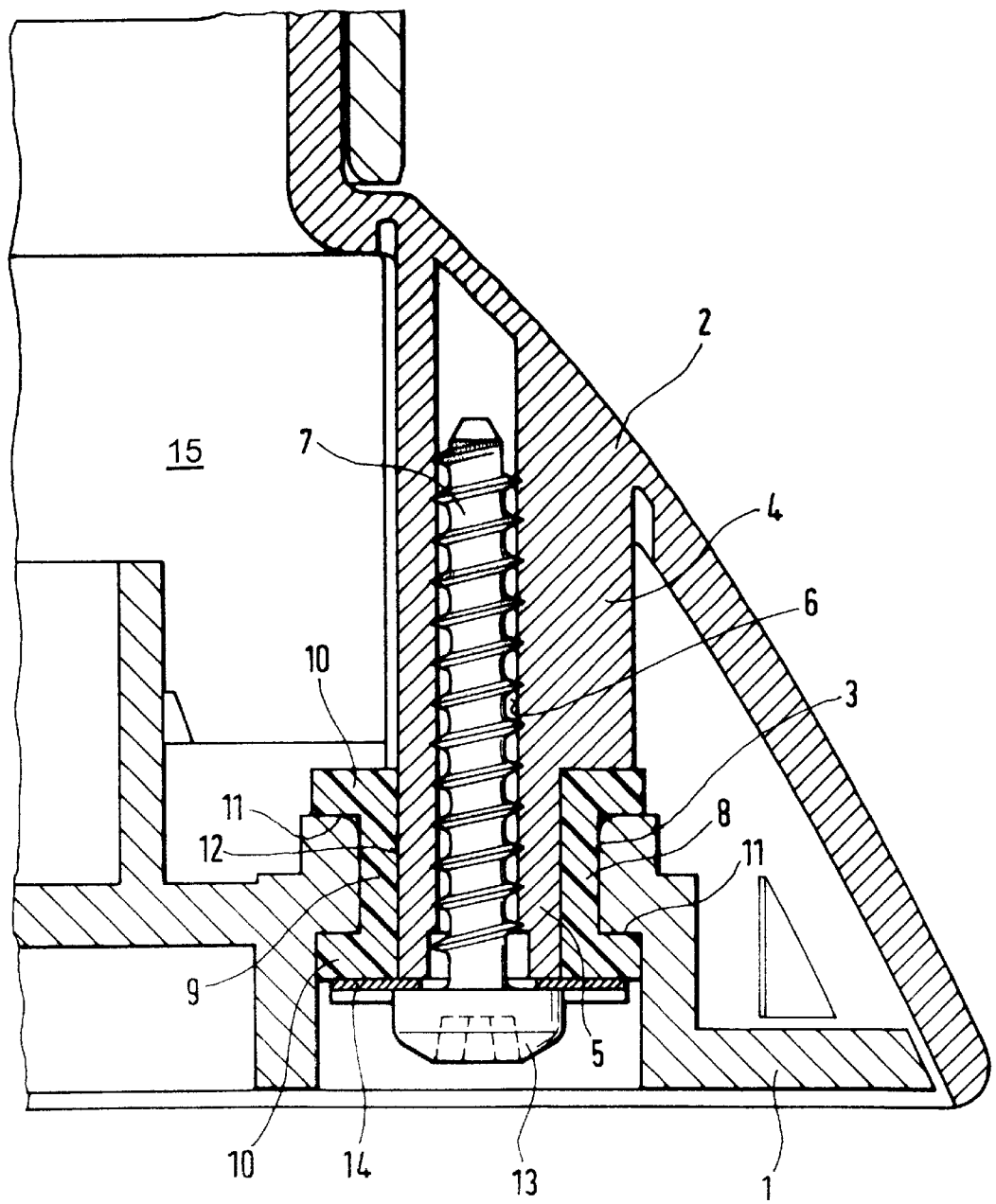

ELECTRICAL HOUSEHOLD APPLIANCE

CROSS-REFERENCE TO RELATED APPLICATION

This application is a continuation of copending International Application No. PCT/EP01/02081, filed Feb. 23, 2001, which designated the United States and was not published in English.

BACKGROUND OF THE INVENTION

Field of the Invention

The invention relates to an electrical household appliance, in particular, a food processor, having a drive motor installed in the housing, which housing includes at least one bottom and at least one top housing part, the housing parts being held together by a screw connection.

Such appliances have a housing including at least one top part and one bottom part. The two housing parts are usually connected to one another by screws. Provided for such purpose on one housing part are corresponding fastening holes, through which a screw can be guided and screwed into a bore provided on the other housing part. The housing parts butt directly against one another at the connecting locations. It is, thus, possible for vibrations that emanate from a drive motor disposed on one housing part to be transmitted without damping to the other housing part, this resulting in correspondingly pronounced noise formation.

SUMMARY OF THE INVENTION

It is accordingly an object of the invention to provide an electrical household appliance that overcomes the hereinafore-mentioned disadvantages of the heretofore-known devices of this general type and that dampens the vibrations emanating from the drive motor to a pronounced extent and, thus, substantially avoids pronounced noise development.

With the foregoing and other objects in view, there is provided, in accordance with the invention, a electrical household appliance, including a housing having at least one bottom housing part with connecting locations and at least one top housing part with connecting locations, screw connections holding the at least one bottom housing part and the at least one top housing part together at the connecting locations, a drive motor disposed in the housing, and damping elements disposed at the connecting locations preventing direct contact of the at least one bottom housing part and the at least one top housing part at the connecting locations. Preferably, the appliance is a food processor.

According to the invention, provided at the connecting locations are vibration-damping elements, which prevent direct contact of the housing parts at the connecting locations. It is, thus, only possible for the vibrations emanating from the drive motor, which is coupled to one housing part, to be transmitted to the other housing part through the damping elements, the damping elements resulting in pronounced damping of the vibrations and only permitting reduced noise development.

In accordance with another feature of the invention, particularly straightforward but effective damping elements are provided if it is provided that the damping elements are configured as elastically deformable buffer parts, which are disposed as an intermediate layer between the housing parts.

In accordance with a further feature of the invention, particularly effective noise damping is achieved in that fastening holes are provided on one housing part and stubs provided with a bore, which serves for accommodating a screw, are provided on the other housing part, in that the stubs are enclosed on their outside by a tubular element of elastic material, and disk-like elements of elastic material are disposed on both sides of the fastening holes, a housing extension, which bears the stub, butting against one side, and the head of the screw butting against the other side, of the respective disk-like element.

In accordance with an added feature of the invention, for the purpose of fitting the damping parts, installation is made considerably easier in that the tubular element and the disk-like element are configured as a single-piece elastomer part in the form of a yarn reel. A rubber element so configured avoids both direct contact between the fastening holes and the stubs that are to be introduced therein and direct abutment of the housing extensions, which bear the stubs, and the heads of the screws against the housing region that contains the fastening holes. It is, thus, not possible for vibration to be transmitted without damping at any location of the connection.

With the objects of the invention in view, in a food processor having a drive motor, there is also provided a housing assembly including at least one bottom housing part with connecting locations, at least one top housing part with connecting locations, connection devices holding the at least one bottom housing part and the at least one top housing part together at the connecting locations, and damping elements disposed at each of the connecting locations and preventing direct contact between the at least one bottom housing part and the at least one top housing part.

With the objects of the invention in view, there is also provided a food processor, including a housing having at least one bottom housing part with connecting locations and at least one top housing part with connecting locations, a drive motor disposed in the housing, connection devices holding the at least one bottom housing part and the at least one top housing part together at the connecting locations, and damping elements disposed at each of the connecting locations and preventing direct contact between the at least one bottom housing part and the at least one top housing part.

In accordance with a concomitant feature of the invention, the connection devices are screws.

Other features that are considered as characteristic for the invention are set forth in the appended claims.

Although the invention is illustrated and described herein as embodied in an electrical household appliance, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The FIGURE is a fragmentary, cross-sectional view of an electrical household appliance according to the invention.

DESCRIPTION OF THE PREFERRED EMBODIMENTS

Referring now to the single FIGURE of the drawing, a bottom housing part 1, and a top housing part 2, of an electrical household appliance, e.g., of a food processor or of a juice extractor, are illustrated. Such appliances have an electric drive motor 15 that causes vibrations that, as a result of the connection between the two housing parts, are transmitted from the housing part that bears the drive motor 15 to the other housing part. It is possible here for the other housing part to act as a resonant body, this resulting in pronounced noise development.

At the respective connecting locations of the two housing parts, in each case one fastening hole 3 is provided on the bottom housing part 1. At that location of the top housing part 2 that corresponds with the fastening hole 3, a projecting stub 5 is integrally formed on a housing extension 4. The stub 5 has a bore 6 for accommodating a screw 7.

Inserted into each fastening hole 3 is a rubber element 8, or else an element of some other elastic material, which is shaped like a yarn reel, i.e., provided at both ends of a tubular central part 9 in each case is a peripheral border 10 that is oriented radially outward in relation to the central part 9. The rubber element 8 is introduced into the respective fastening hole 3 before the two housing parts 1 and 2 are joined together. On account of the elasticity of the rubber element 8, the relevant peripheral border 10 may be compressed correspondingly, with the result that it can be guided through the fastening hole 3. Once it has been introduced into the fastening hole 3, the rubber element 8 butts against the wall region 11 of the bottom housing part 1, the wall region 11 containing the fastening hole 3.

The stub 5, which is connected to the top housing part 2, is plugged into the central opening 12 of the rubber element 8 and the screw 7 is, then, screwed into the bore 6. It is also possible here, to increase the abutment surface area of the screw head 13, to insert a washer 14 in between. When the screw 7 is screwed into the bore 6, the two peripheral borders 10 of the rubber element 8 are pressed together, on one hand, between the relevant housing extension 4 and that side of the wall region 11 that is adjacent to the latter and, on the other hand, between the screw head 13 or the washer 14 and that side of the wall region 11 that is adjacent to the screw head 13 or the washer 14, the corresponding fixed connection between the two housing parts 1 and 2 being produced as a result.

In the case of such a connection between the two housing parts 1 and 2, there is no direct contact between the two housing parts 1 and 2 at any location. It is also the case that the screw 7, which is connected to the top housing part 2, does not come into contact with the bottom housing part 1 at any location because the corresponding peripheral border 10 of the rubber element 8 is located between the screw head 13 and the wall region 11. It is, thus, only possible for the vibrations emanating from the drive motor 15, which is disposed on the bottom housing part 1, to be transmitted in a damped manner to the top housing part 2. As a result, the noise development is vastly inhibited.

We claim:

1. An electrical household appliance, comprising:
   a housing having:
      at least one bottom housing part with connecting locations; and
      at least one top housing part with connecting locations;
   screw connections holding said at least one bottom housing part and said at least one top housing part together at said connecting locations;
   a drive motor disposed in said housing; and
   damping elements disposed at said connecting locations preventing direct contact of said at least one bottom housing part and said at least one top housing part at said connecting locations.

2. The household appliance according to claim 1, wherein said damping elements are elastically deformable buffer parts disposed as an intermediate layer between said at least one bottom housing part and said at least one top housing part.

3. The household appliance according to claim 2, wherein:
   screws each having a head for securing said at least one bottom housing part and said at least one top housing part together;
   one of said at least one bottom housing part and said at least one top housing part define fastening holes having two sides;
   another of said at least one bottom housing part and said at least one top housing part has housing extensions bearing stubs each having an outside surface and a bore for accommodating one of said screws therein;
   a tubular element of an elastic material respectively encloses said outside surface of each of said stubs; and
   disk-shaped elements of an elastic material are disposed on both of said two sides of said fastening holes, each of said disk-shaped elements having two sides, said housing extension butting against one of said two sides of a respective one of said disk-shaped element and said head of each of said screws butting against another of said two sides of a respective one of said disk-shaped elements.

4. The household appliance according to claim 3, wherein said tubular element and said disk-shaped elements are a single-piece, yarn-reel-shaped elastomer part.

5. The household appliance according to claim 2, wherein:
   screws each having a head for securing said at least one bottom housing part and said at least one top housing part together;
   one of said housing parts define fastening holes having two ends;
   another of said housing parts has housing extensions with stubs, each of said stubs having an outside surface and a bore for accommodating one of said screws therein; and
   for each of said stubs, said damping elements each have:
      an elastic tubular portion respectively enclosing said outside surface of each of said stubs; and
      two elastic disk-shaped portions disposed on each of said two ends of said fastening holes, said housing extension butting against one of said two disk-shaped portions and said head of a respective one of said screws butting against another of said two disk-shaped portions.

6. The household appliance according to claim 5, wherein said tubular portion and said two disk-shaped portions are a single-piece, yarn-reel-shaped elastomer part.

7. The household appliance according to claim 1, wherein each of said damping elements is a single-piece, yarn-reel-shaped elastomer part.

8. The household appliance according to claim 1, wherein each of said damping elements is a single-piece, yarn-reel-shaped elastomer part having a tubular portion and two disk-shaped portions.

9. The household appliance according to claim 1, wherein the electrical household appliance is a food processor.

10. In a food processor having a drive motor, a housing assembly comprising:

at least one bottom housing part with connecting locations;

at least one top housing part with connecting locations;

connection devices holding said at least one bottom housing part and said at least one top housing part together at said connecting locations; and damping elements disposed at each of said connecting locations and preventing direct contact between said at least one bottom housing part and said at least one top housing part.

11. A food processor, comprising:

a housing having:

at least one bottom housing part with connecting locations; and at least one top housing part with connecting locations;

a drive motor disposed in said housing;

connection devices holding said at least one bottom housing part and said at least one top housing part together at said connecting locations; and damping elements disposed at each of said connecting locations and preventing direct contact between said at least one bottom housing part and said at least one top housing part.

12. The food processor according to claim 11, wherein said connection devices are screws.

\* \* \* \* \*